United States Patent [19]
Bisberg

[11] 3,903,613
[45] Sept. 9, 1975

[54] BICYCLE TRAINING DEVICE FOR SIMULATING THE MOVEMENT OF A BICYCLE EQUIPPED WITH GEARS

[76] Inventor: Aaron M. Bisberg, 499 N. Broadway, White Plains, N.Y. 10603

[22] Filed: Feb. 7, 1974

[21] Appl. No.: 440,401

[52] U.S. Cl. .................. 35/11; 73/117; 73/379; 272/18; 272/73
[51] Int. Cl.² .................. G09B 9/04; A63B 69/16
[58] Field of Search .......... 272/1 C, 16, 17, 18, 73; 35/11, 12 S, 22 R; 73/117, 123, 379, 432 SD

[56] References Cited
UNITED STATES PATENTS

| | | | |
|---|---|---|---|
| 2,783,044 | 2/1957 | Sbarra | 272/73 X |
| 2,784,591 | 3/1957 | Shoor | 73/379 |
| 3,486,242 | 12/1969 | Aronson | 35/11 |
| 3,511,097 | 5/1970 | Corwin | 73/379 |
| 3,526,042 | 9/1970 | Nelson | 35/11 |
| 3,554,022 | 1/1971 | Geul | 73/117 |
| 3,643,943 | 2/1972 | Erwin, Jr. et al. | 272/73 X |

FOREIGN PATENTS OR APPLICATIONS

| 16,921 | 6/1905 | United Kingdom | 73/123 |

Primary Examiner—Richard C. Pinkham
Assistant Examiner—R. T. Stouffer
Attorney, Agent, or Firm—Burgess, Dinklage & Sprung

[57] ABSTRACT

A bicycle training device for simulating the movement of a bicycle equipped with gears and for simulating road and wind conditions when a cyclist on such bicycle encounters an incline or wind which comprises a bicycle wheel equipped with gears rotatably mounted on a stand and driveable by a bicycle operator, a device for conveying to an operator a suggested road condition, a device for regulating the bicycle wheel in response to the regulating device which regulating device regulates the resistance against rotation of the bicycle wheel by the operator.

13 Claims, 3 Drawing Figures

PATENTED SEP 9 1975   3,903,613

BICYCLE TRAINING DEVICE FOR SIMULATING THE MOVEMENT OF A BICYCLE EQUIPPED WITH GEARS

BACKGROUND OF THE INVENTION

1. Field of the Invention

This invention is directed to a bicycle training device. More particularly, this invention relates to a bicycle training device of the stationary type having a driveable wheel driveable by an operator which wheel represents the rear driveable wheel of a bicycle, said training device provided with means for regulating the resistance against movement of said bicycle wheel and means for conveying to the operator that conditions of greater or lesser resistance to forward movement are about to be encountered. This invention is particularly directed to a bicycle training apparatus for use in training bicycle operators how to operate a multi-geared bicycle such as one equipped with 10 forward speeds, and proper cycling form for various force requirements.

DISCUSSION OF THE PRIOR ART

In recent years the sport of cycling has experienced a renewed growth. This is due to several factors, notably the recognition of the desirability of being physically fit, the energy crisis and the advent of bicycles having numerous forward speeds. It is not uncommon to see a number of cyclists pedaling bicycles equipped with eight to ten forward gears. Problems are encountered, however, in utilizing these multi-geared bicycles and even those who are familiar with the operation of a normal bicycle having up to say five gears, have to be somewhat reeducated in the use of a bicycle having, for instance, 10 gears. To illustrate, if a person is pedaling a ten speed bicycle and approaches a traffic light in the 10th speed and does not shift prior to stopping at the traffic light, problems are encountered during startup. Most multi-speed bicycles, unlike automobiles, cannot be shifted from one gear to another while at a stopped position. Thus, when the light turns green, it is necessary to start the bicycle up in the 10th gear, the gear most inappropriate for startup. This requires a tremendous expenditure of energy by the cyclist and may cause dangerous weaving in traffic. It is only after the bicycle resumes the forward motion that the bicycle can be downshifted from the high gear into a lower, more appropriate gear. This is particularly acute in ten speed bicycles which cannot be pedaled in reverse to provide the movement of the shift assembly required for the the shifting function.

It has therefore become desirable to provide an apparatus for educating owners of a multi-speeded bicycle such as a ten speed bicycle so as to teach them which gear should be employed for a specific road condition. Problems are encountered in the use of these bicycles when it is necessary to pedal up inclines. Since the cyclist has a choice of ten gears, it is likely that the inexperienced cyclist will select an inappropriate gear for a specific incline. It has therefore become desirable to provide an apparatus which will train the owner of a ten speed bicycle to shift the bicycle into the proper gear in response to a specific road condition, e.g., incline. It has become particularly desirable to provide a bicycle training device in which the operator is apprised either by audio signal or visual means of a change in road condition, e.g., incline which is accompanied by a commensurate change in the resistance to the pedaling function on the bicycle.

SUMMARY OF THE INVENTION

Broadly, this invention contemplates a bicycle training device for simulating the movement of a bicycle equipped with gears and for simulating road conditions when a bicycle encounters a resistance which comprises rotary means driveable by a bicycle operator, information means, which conveys to said operator a suggested condition, regulating means responsive to said information means, said rotary means responsive to said regulating means which regulating means regulates the resistance against rotation of said rotary means by said operator.

In accordance with the present invention there is provided an information supplying means. This information supplying means is usually in the form of a tape recorded or other audio message, although visual messages are also contemplated. When the apparatus is turned on and an operator is in position to revolve the rotatary means, usually the rear driveable wheel of a bicycle, the operator is apprised of a given road condition by the audio or visual information means. This information means also supplies an electrical signal to a regulating means which, in turn, regulates the resistance against rotation of the rotary means by the operator. Preferably, the information means associated with the bicycle training device is equipped to apprise the operator of a number of different road conditions and to impart to the regulating means sufficient electronic instructions so that the regulating means regulates the resistance to the rotary motion commensurately to the audio or visual instruction supplied to the operator.

To illustrate the invention, there is provided a tape recorder with playback facilities and a prerecorded tape is inserted therein. An operator gets on the bicycle training device and assumes a pedaling position. The tape recorder is turned on and the prerecorded tape advises the cyclist that the cyclist is at level ground. The cyclist pedals or rotates the rotary means and is thus apprised of the normal resistance that the bike has to a level roadway. Thereafter, the tape advises the cyclist that a 5 percent incline lies ahead. At that time, or shortly thereafter, the information means comprising the tape player emits an electronic pulse or other electronic signal to a regulating means which increases the resistance against rotary movement of the rotary means. The cyclist is thus apprised of the feeling which is encountered when the grade increases to a 5 percent incline. The tape can thereafter instruct the cyclist that if the cyclist were properly operating the multi-speeded bicycle he would have shifted into a specifically named gear.

The tape player can continue to give subsequent instructions. For instance, the tape player can thereafter advise the cyclist that a steeper grade, say a 20 percent grade lies still further ahead. Simultaneously therewith, or shortly thereafter, the tape player can emit an electronic signal to which the regulating means is responsive which will, in turn, regulate, i.e., increase, the resistance to the rotary movement of the rotary means by a like degree. The tape, thereafter, instructs the cyclist that had the cyclist operated the bicycle correctly, he would have downshifted into a specified gear. In this manner a cyclist can learn which gear should be employed for a given condition. Thereafter the cyclist can use his own bicycle on the roadway with maximum efficiency owing, in particular, to having been preoriented by using the bicycle training device even, perhaps, his own bicycle on the device.

BRIEF DESCRIPTION OF DRAWINGS

The present invention can be more readily understood and appreciated when reference is made to the accompanying drawings in which.

DESCRIPTION OF PREFERRED EMBODIMENT

A preferred embodiment of the present invention is illustrated in the accompanying drawings. It will be seen that the training device of the present invention can be used with little or no experience with multi-speeded bicycles to simulate road conditions while the cycle and cyclist are in a static position except for rotation of the rear wheel, chain and pedals. The device, using an audio or visual component, advises the trainee what road conditions he is approaching, recommends the proper arrangement of gears and then, through the use of an electronic signal, simulates those road conditions.

Figure 1:
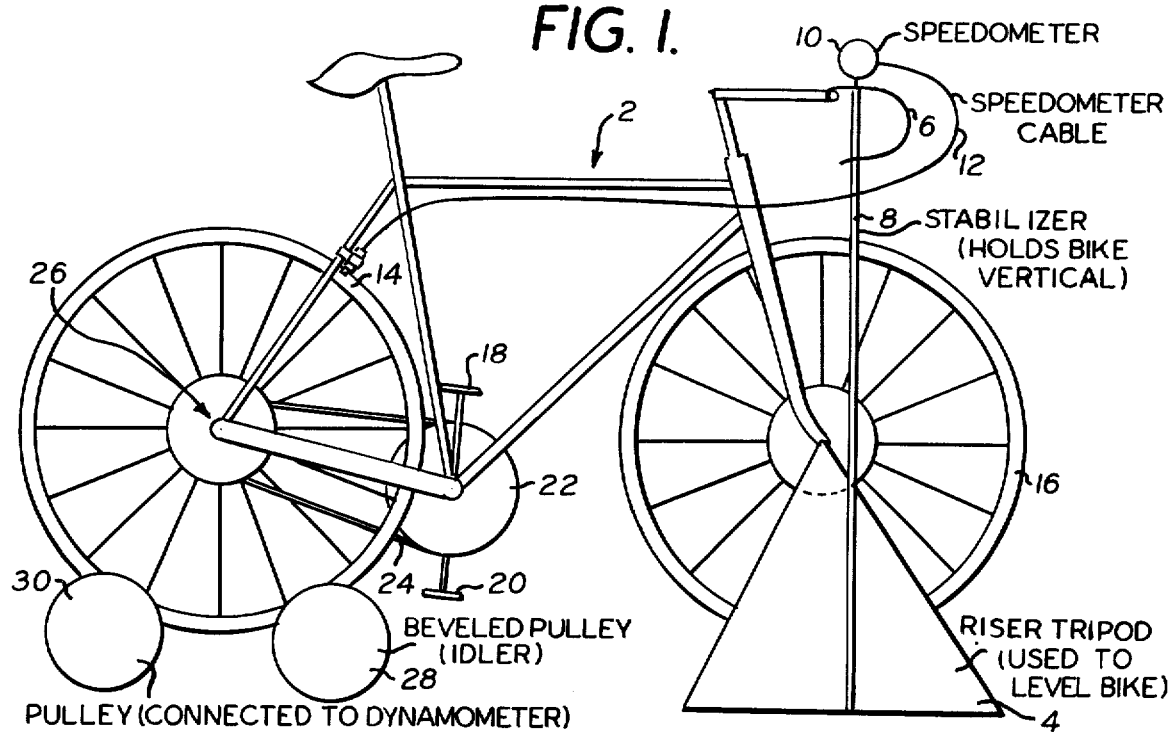
FIG. 1 is a side elevation of a bicycle mounted so as to be restrained from forward movement and further mounted so as to be in association with the bicycle training device of the present invention.
Figure 2:
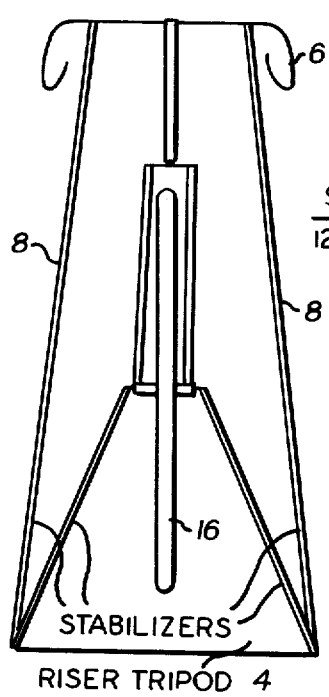
FIG. 2 is a frontal view of the bicycle of FIG. 1.

Referring to the drawings, and especially to FIG. 1, there is provided a bicycle 2 mounted on a riser tripod 4 at the handlebars 6. Alternatively, the bicycle can be mounted by adapting the riser means to the stabilizers 8. The riser tripod unit 4 can be physically connected to the rear pulley assembly 28, 30 or constructed separately as shown. The bicycle is desirably equipped with a speedometer 10 mounted on the handlebars 6 and responsive through a speedometer cable 12 to the movement of the rear wheel 14 or pully 30. In use, it will be understood that the front wheel 16 does not move. Pedals 18 and 20, pivotally mounted on a sprocket wheel assembly 22 about which a chain 24 is mounted, are provided. Chain 24 is affixed to the gear assembly 26 comprising a plurality, e.g., about 5, gear members providing for 10 speeds. The bicycle is the same type of bicycle commercially sold. It is merely mounted on the front riser tripod 4 such that the rear wheel 14 is disposed on an idler pulley 28 lying toward the front of the bicycle and a rearwardly disposed pulley 30 which is responsive to movement of the rear wheel 14.

Figure 3:
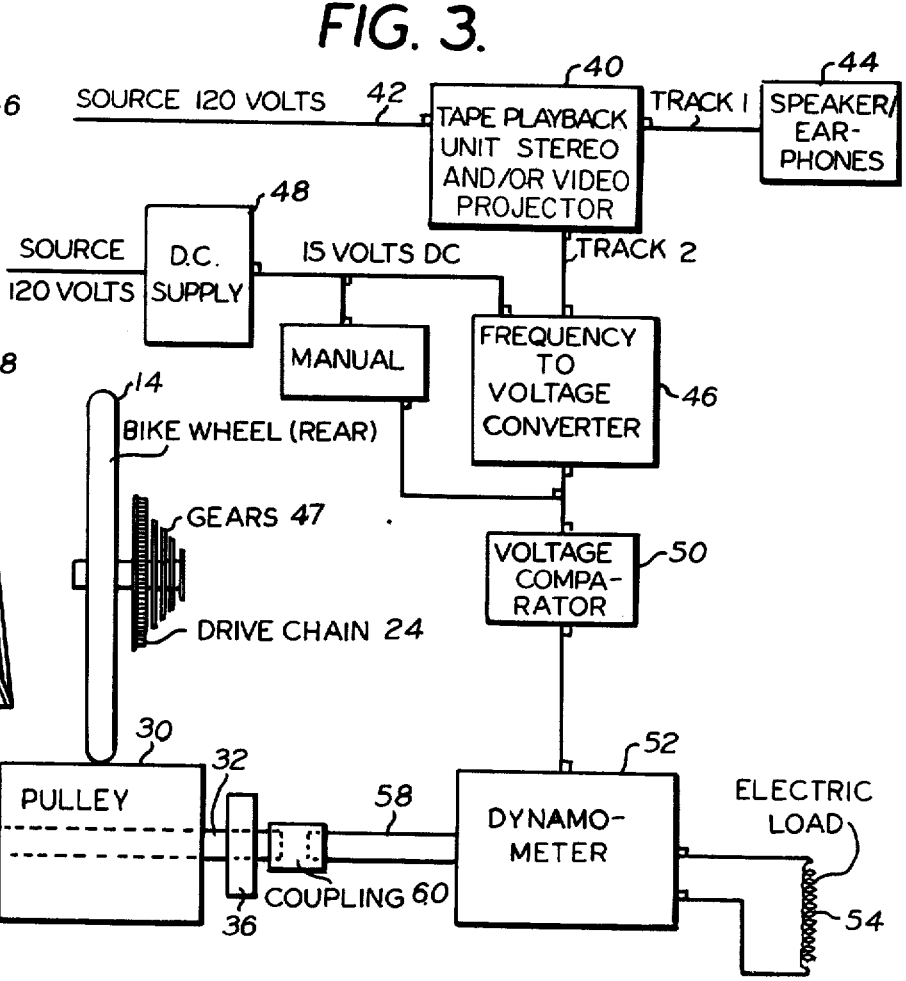
FIG. 3 is a rear view partially schematically drawn with some portions of the bicycle itself removed.

Referring to FIG. 3, the rear bicycle wheel 14 is disposed on a driven pulley 30 which, in turn, is mounted on an axle 32. A pair of bearings 34 and 36 are provided to insure that the axle 32 moves freely to the extent desired.

An audio information system is shown in FIG. 3 which comprises a tape playback unit 40 powered by house current of a 110–120 volt, 60 cycle current entering from current source 42. The tape playback unit utilizes a tape having two tracks. One track supplies a normal audio signal through a speaker 44 of the tape playback unit to the operator on the bicycle. The other track supplies varying frequencies to a frequency to volt converter 46 which is itself supplied by DC current converted from 120 volt AC 48. The frequency emitted on track 2 from the tape playback unit corresponds to a specific audio instruction or information relayed audibly on track 1 to the operator. The frequency is fed to a converter 46 which regulates the amount of voltage fed through a voltage comparator 50 which, in turn, feeds a dynamometer 52. Dynamometer 52 is connected to an electric load circuit 54 whicih together with voltage comparator 50 maintain a fixed resistance on the dynamometer. The dynamometer 52 applies resistance to movement of bicycle wheel 14 through pulley 30 and axle 32.

The operation of the device is as follows. When the operator begins to turn the pedals 18 and 20 of the bicycle, the sprocketed wheel 22 moves, moving the chain 24 and, in turn, the rear wheel 14 of the bicycle. This turns the pulley 30 which is linkagely connected to the dynamometer 52. An electric charge is created by this turning which is dissipated by the electric load circuit 54. With no frequency transmitted to converter 46 and the "electric load" circuit dissipating the charge created by turning the bicycle wheel, there is no load on the system and the trainee is turning the bicycle wheel in a "free-wheeling" mode.

As the tape in the tape playback unit moves, track 2 provides a frequency signal to converter 46 which sends a voltage through the voltage comparator 50 to the dynamometer 52 which is in turn creating a resistance to pedaling and imparting a resistance through axles 32 and 58. At the same time, or somewhat therebefore, the other track on the tape playback advises the operator that an incline lies ahead on the roaway. The resistance imparted to the beveled pulley 30 corresponds in degree to the simulated incline of which the operator has been advised by the audio signal of the tape playback unit.

The tape playback unit can thereafter advise by audible signal that an even greater incline approaches. At this time the tape playback unit sends an increased frequency through converter 46. This allows an increased voltage to pass through the voltage comparator 50 to the alternator thereby increasing the resistance to the beveled pulley 30. This resistance, it should be understood, is even greater than the resistance imparted to the pulley when the tape was providing a lower frequency. This is due to the function of the converter which can provide a continuum of voltage change by the impart of a continuum of frequency change at any rate.

This process can continue through any frequencies providing a means for varying increasing and decreasing resistances. To reduce resistance, the frequency input from the tape playback is decreased. In the system shown the function of the voltage comparator is to maintain a constant resistance at a given setting regardless of the revolutions per minute of the bicycle wheel.

It will be apparent that the bicycle training device of the present invention is capable of numerous modifications. For instance, while the apparatus is shown using a bicycle such as one which can be employed on a roadway, the bicycle can be substituted by a bicycle simulating apparatus such as one of the type employed in gymnasiums comprising only a single driven wheel and the pedal, sprocket and chain assembly. Of course, the device would be provided with a gear shifting mechanism as is the device shown in the drawings. Similarly, while a preferred embodiment of the present invention uses a tape playback unit employing a prerecorded tape, visual stimuli can be utilized together with or as an alternative to a tape playback. For instance, the bicycle training device can be placed in front of a movie screen on which is projected a series of still or motion pictures showing the progression down a road of a bicycle and showing the incline which the bicycle is about to encounter. When the motion picture film passes through the projector and the film strips containing the incline pass therethrough, frequencies can be received by a track disposed next to the motion picture film which frequencies will be passed through converter 46 and allow the apparatus to function as above described. Obviously, a video and audio system can be employed together in which case the audio component can give audible instructions to the cyclist while the video portion apprises the operator of the road situation which is about to be encountered.

With resepct to the electrical assembly employed, it is not necessary to employ the precise means shown in the drawings, for any assembly which performs the essential functions of the invention can be utilized, e.g., hydraulic or mechanical resistance. Essentially, the invention involves a bicycle or bicycles simulating means comprising a rotary wheel or the like which is responsive to a resistance against rotation imposed by a regulating means, in turn responsive to an information supplying means. The information supplying means performs two functions. It gives a sensual message to the operator of the bicycle while adjusting through the regulating means the resistance against the rotation of the bicycle wheel.

To illustrate a preferred method of training a cyclist in the use of a multi-geared bicycle, the following training procedure is employed with the apparatus of the invention:

The trainee mounts the bicycle and the tape is started. The tape directs the trainee cyclist through an explanation of the gears and directs the trainee to practice them until the trainee has a general understanding of, and feel for, how the gears work. No braking is applied to the pulley during this phase, though the tape is constantly directing and explaining function to the trainee.

The second phase of the training consists of tape descriptions for anticipated road conditions together with emissions of signals from the tape for the purpose of simulating those conditions and applying a braking force on the rear wheel. The primary objective of this phase is to make the trainee aware of the need for planning ahead when riding a ten speed bicycle.

As an example, the tape directs the trainee to cycle under a given condition, say in a high gear on a level surface. The tape then informs the trainee that he is approaching a red light and that he is to stop. The tape will then inform the trainee that the light has changed and he is to proceed. The trainee will learn that it is very difficult to start up in high gear and that for better starting control, especially in traffic, he should start in one or two lower gears. Since he cannot shift while the cycle is at rest, he should have prepared for it when he was approaching his stop and geared down before complete arrest. No braking simulation is needed for this exercise.

In another example, the tape instructs the trainee to cycle in high gear on a flat roadway and indicates to him that he is approaching a hill. The tape then emits an increasing frequency which passes through the converter, in turn, applying and regulating the braking force applied to the rear wheel. This simulates uphill cycling. The trainee quickly learns that once he has started uphill, there is no way he can shift down without putting a great deal of strain on himself and the bicycle.

By use of the training device of the present invention, the simulation of a variety of road and wind conditions is possible together with directions for proper cycling. The tape describes conditions and directs the trainee as to how to employ the cycle under the given conditions. This is provided in a simple, economical and compact unit. Obviously, the device of the present invention is capable of numerous condition simulations. This is done simply by regulating the frequency input and having a commensurate number of instructions on the tape. The present invention has a beneficial effect in that the trainee learns the safe and proper operation of a multi-speeded bicycle under controlled and safe conditions.

In one embodiment of the invention, a manual control is provided whereby the voltage to the alternator can be regulated in response to manual control. This manual control bypasses the information means, e.g., tape playback unit, and the frequency to voltage converter. The manual control can be provided on a device which is free of the information means or it can be provided on a device as shown in FIG. 3 which has such information means therein. When a device has an information means, such as in the form of a tape playback unit, the manual control can be utilized to regulate the resistance independent of and separate from the manner of resistance regulation provided by the signals emitted by track 2 on the tape passing through the tape playback unit. Thus, the device of the present invention can be provided with the manual control as shown in FIG. 3 or the manual control can be provided without the tape playback unit and frequency to voltage converter 46.

The device of the present invention is particularly useful as a support facility for selling bicycles. Thus, a bicycle company can provide a tape which contains auditory comments about the performance of the bicycle which is mounted on the apparatus. The bicycle would, of course, be a bicycle manufactured or sold by the bicycle company. The prospective customer would be invited to ride the bicycle in the shop at the same time that the "sales pitch" was played. The prospective customer would be invited to pedal the bicycle and to experience its performance on a simulated incline. The prospective customer would be asked to switch the gears and to notice how the bicycle performed. Obviously, the unit is equipped to handle the bicycle of virtually any manufacturer of multi-geared bicycles, particularly bicycles having ten forward speeds.

What is claimed is:

1. A bicycle training device for simulating the movement of a bicycle equipped with gears and for simulating road conditions when a bicycle enters a resistance situation which device comprises rotary means in the form of a bicycle wheel having rotatably mounted pedals connected thereto, said bicycle wheel having a gear assembly comprising a plurality of gears connected to a means for selectively connecting said bicycle wheel to said pedals through each of said gears, one gear at a time which bicycle wheel is revolvable about a horizontal axis and driveable by rotation of said pedals by a bicycle operator, audio information means which conveys audibly to said operator a suggested road condition, regulating means responsive to said audio information means, said rotary means responsive to said regulating means, which regulating means regulates the resistance against rotation of said rotary means by said operator.

2. A bicycle training device according to claim 1 wherein said audio information comprises an audio means for emitting an audio message to the operator which audio means also supplies a specific electronic signal corresponding to the audio message to said regulating means which, in turn, adjusts the resistance against revolution of said rotary means to correspond with the audio message.

3. A bicycle training device according to claim 2 wherein said rotary means comprises a rear bicycle wheel having an axle, said axle having gears, in turn connected to a chain, which chain is connected to a pair of bicycle pedals, said bicycle wheel mounted so as to be restrained from forward movement, said bicycle rear wheel disposed on an idler pulley and on a driveable pulley, said driveable pulley responsive to said regulating means.

4. A bicycle training device according to claim 3 wherein said regulating means comprises a dynamometer balanced by an electric load circuit, said dynamometer being linkagely connected to an axle driven by said driveable pulley.

5. A bicycle training device according to claim 4 wherein said audio means comprises a tape playback unit operable to emit a signal as well as an audible sound, said apparatus further comprises a converter which converts said signal to voltage levels through a transformer which in turn are fed via a voltage comparator to said dynamometer.

6. A bicycle training device according to claim 5 wherein said voltage comparater is disposed between said audio means and said dynamometer.

7. A bicycle training device according to claim 1 having manual control means whereby the resistance against rotation of said rotary means can be regulated independent from said information means and said regulating means responsive to said information means.

8. A bicycle training device for simulating the movement of a bicycle equipped with gears and for simulating road conditions when a bicycle enters a resistance situation, which device comprises rotary means in the form of a bicycle wheel having rotatably mounted pedals connected thereto, said bicycle wheel having a gear assembly comprising a plurality of gears connected to a means for selectively connecting said bicycle wheel to said pedals through each of said gears, one gear at a time, which bicycle wheel is revolvable about a horizontal axis and is driveable by rotation of said pedals by a bicycle operator, means for regulating the resistance against rotation of said rotary means by said operator, said means for regulating a resistance being responsive to a manual control means fed by an electric current.

9. A bicycle training device for simulating the movement of a bicycle equipped with gears and for simulating road conditions when the bicycle enters a resistance situation which device comprises rotary means in the form of a bicycle wheel having rotatably mounted pedals connected thereto, said bicycle wheel having a gear assembly comprising a plurality of gears connected to a means for selectively connecting said bicycle wheel to said pedals through each of said gears, one gear at a time, which bicycle wheel is revolvable about a horizontal axis and driveable by rotation of said pedals by a bicycle operator, visual infomrmation means which conveys visually to said operator a suggested road condition, regulating means responsive to said visual information means, said rotary means responsive to said regulating means, which regulating means regulates the resistance against rotation of said rotary means by said operator.

10. A bicycle training device according to claim 9 wherein said visual information means comprises a visual means for emitting a visual message to the operator which visual means also supplies a specific electronic signal corresponding to the visual means of said regulating means which, in turn, adjusts the resistance against revolution of said rotary means to correspond with the visual message.

11. A bicycle training device according to claim 10 wherein said rotary means comprises a rear bicycle wheel having an axle, said axle having gears, in turn connected to a chain, which chain is connected to a pair of bicycle pedals, said bicycle wheel mounted so as to be restrained from forward movement, said bicycle rear wheel disposed on an idler pulley and on a driveable pulley, said driveable pulley responsive to said regulating means.

12. A bicycle training device according to claim 11 wherein said regulating means comprises a dynamometer balanced by an electric load current, said dynamometer being linkagely connected to an axle driven by said driveable pulley.

13. A bicycle training device according to claim 11 having a manual control means whereby the resistance against rotation of said rotary means can be regulated independent from said visual information means and said regulating means response to said visual information means.

* * * * *